(12) United States Patent
Biskeborn (10) Patent No.: US 7,486,476 B2
(45) Date of Patent: Feb. 3, 2009

(54) MAGNETIC DATA SYSTEM HAVING A SHIELD BIASING CIRCUIT WITH RESISTOR COUPLED BETWEEN THE SHIELD AND SUBSTRATE

(75) Inventor: Robert Glenn Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 11/304,496

(22) Filed: Dec. 14, 2005

(65) Prior Publication Data

US 2007/0133131 A1 Jun. 14, 2007

(51) Int. Cl.
*G11B 5/265* (2006.01)
*G11B 5/29* (2006.01)

(52) U.S. Cl. .................. 360/121; 360/66; 360/323; 360/128

(58) Field of Classification Search .......... 360/66, 360/121, 316, 128, 323
See application file for complete search history.

(56) References Cited

U.S. PATENT DOCUMENTS

| | | | | |
|---|---|---|---|---|
| 4,802,043 | A | * 1/1989 | Sato et al. | 360/316 |
| 5,309,295 | A | 5/1994 | Bailey et al. | 360/66 |
| 5,701,213 | A | 12/1997 | Cameron et al. | 360/66 |
| 6,246,553 | B1 | * 6/2001 | Biskeborn | 360/323 |
| 6,252,735 | B1 | 6/2001 | Chung et al. | 360/67 |
| 6,342,986 | B2 | 1/2002 | Nguyen | 360/75 |
| 6,356,404 | B1 | 3/2002 | Nguyen | 360/66 |
| 6,359,750 | B1 | * 3/2002 | Hughbanks et al. | 360/128 |
| 6,490,112 | B1 | 12/2002 | Ranmuthu et al. | 360/66 |
| 6,847,501 | B2 | 1/2005 | Cheung et al. | 360/46 |

* cited by examiner

*Primary Examiner*—A. J. Heinz
(74) *Attorney, Agent, or Firm*—Zilka-Kotab, PC (57) ABSTRACT

A magnetic data system according to one embodiment includes a head having a plurality of readers formed above a common substrate, each reader further comprising a shield and a sensor, a bias circuit associated with each reader for passing a bias current through the sensor thereof, wherein the bias circuits are floating. A charge clamp electrically couples each shield to the associated bias circuit. A shield biasing circuit is operatively coupled to each shield for setting a potential of the shield independently of the bias current.

14 Claims, 6 Drawing Sheets

MAGNETIC DATA SYSTEM HAVING A SHIELD BIASING CIRCUIT WITH RESISTOR COUPLED BETWEEN THE SHIELD AND SUBSTRATE

FIELD OF THE INVENTION

The present invention relates to magnetic storage systems, and more particularly, this invention relates to a magnetic storage system having reader shields at definable potentials.

BACKGROUND OF THE INVENTION

Business, science and entertainment applications depend upon computers to process and record data, often with large volumes of the data being stored or transferred to nonvolatile storage media, such as magnetic discs, magnetic tape cartridges, optical disk cartridges, floppy diskettes, or floptical diskettes. Typically, magnetic tape is the most economical means of storing or archiving the data. Storage technology is continually pushed to increase storage capacity and storage reliability. Improvement in data storage densities in magnetic storage media, for example, has resulted from improved medium materials, improved error correction techniques and decreased areal bit sizes. The data capacity of half-inch magnetic tape, for example, is now measured in hundreds of gigabytes on 512 or more data tracks.

The improvement in magnetic medium data storage capacity arises in large part from improvements in the magnetic head assembly used for reading and writing data on the magnetic storage medium. A major improvement in transducer technology arrived with the magnetoresistive (MR) sensor originally developed by the IBM® Corporation. Later sensors using the GMR effect were developed. AMR and GMR sensors transduce magnetic field changes to resistance changes, which are processed to provide digital signals. Data storage density can be increased because AMR and GMR sensors offer signal levels higher than those available from conventional inductive read heads for a given read sensor width and so enable smaller reader widths and thus more tracks per inch. Moreover, the sensor output signal depends only on the instantaneous magnetic field intensity in the storage medium and is independent of the magnetic field time-rate-of-change arising from relative sensor/medium velocity. In operation the magnetic storage medium, such as tape or a magnetic disk surface, is passed over the magnetic read/write (R/W) head assembly for reading data therefrom and writing data thereto.

The quantity of data stored on a magnetic tape may be increased by increasing the number of data tracks across the tape. More tracks are made possible by reducing feature sizes of the readers and writers, such as by using thin-film fabrication techniques and MR sensors.

The interleaved R/W magnetic tape head with MR sensors allows increased track density on the tape medium while providing bi-directional read-while-write operation of the tape medium to give immediate read back verification of data just written onto the tape medium. Tape recording systems may alternatively implement arrays of "piggyback" R/W pairs, where the writer and reader in each pair are aligned in the direction of tape travel.

In any of the above-mentioned types of heads, e.g., AMR, GMR, MTJ, etc., several forces are present, each potentially contributing to adverse effects on the head. Particularly, the tape acquires a charge as it moves through the tape path and over the head. In the head, the sensor element potential is generally set by virtue of the circuit that provides the sensing current passing therethrough. The sensor shields may or may not have a potential matching the sensor element. Further, the sensor shields and other parts of the head may become charged by interaction with the tape. Thus, as can be appreciated, multiple and varying voltage differentials may be found not only between the tape and the head, but also between various components in the head, e.g., substrate, shields and sensor element. As will soon become apparent, these voltage differentials are believed to be at least partly responsible for adverse tribological interactions on the head.

Compounding the problem is the electric field distribution in the head ceramic. The wafer material used for magnetic recording heads (commonly know as AlTiC), is a ceramic composite material consisting of a matrix of insulative aluminum oxide (alumina, $Al_2O_3$) plus an irregular but interconnected network of electrically conductive titanium carbide (TiC). The uneven distribution of TiC creates an irregular electric field at the interface with the typically overlying insulator. The electric fields at grain edges can be several folds higher than the average field. These high fields are associated with adverse tribological effects, including electrostatic debris deposition and pitting of the head insulator due to electric discharges. These high fields also promote electrical discharge into the tape, thereby charging the tape.

Due to the varying voltage differentials and irregular electric fields between the various parts of a head as well as between head and tape, magnetic heads tend to suffer from adverse tribological interactions, which include electrical discharge, tape changes, head erosion, debris buildup, chemical conversion, head sensor shorting, etc. In both piggyback and interleaved heads, tribological effects are believed to be aggravated by excessive substrate and/or media voltages. When the substrate is electrically floating, relative motion between the head and recording medium may produce substrate and media voltage swings on the order of several 10s of volts. Such voltages are strongly implicated in unfavorable tribological processes such as electrochemical reactions, electrostatic accumulation of debris, and even certain types of wear.

In shielded MR heads, the lower reader shield of each reader is in close proximity to the substrate, separated therefrom by a thin insulator on the order of 1 micron thick. The voltage differences between the adjacent reader shield and substrate is problematic due to their close proximity, and is compounded by the potentially large localized electric fields created by a conductive substrate, e.g., of AlTiC. Such electric fields are implicated in aggravated accumulation of conductive materials that can actually short the MR sensor to its shields and in turn to the substrate.

Consider the following example. Suppose reader shield S2 and the substrate are separated by a thin insulator. Suppose S2 is at 1.5 V, and the substrate is at 6.5V. The difference is 5 V. If the space between them is 0.5 microns, the electric field (gradient) is 10V per micron, a very large value. For comparison, sparking in air, for example as observed on clothing, occurs from a gradient of approximately 1V per micron. In the example presented, the gradient is 10× that. Other unusual effects have been observed, including formation of solid water at room temperature in the presence of larger electric fields. Furthermore, the conductive grain structure of AlTiC concentrates the fields, which can be several times higher than in this example.

Several solutions have been contemplated, but each of these have drawbacks. These solutions include connecting the substrate directly to ground. However, if the reader shields are not clamped to ground, the voltage differential leads to the aforementioned tribological effects between the shields and substrate. Grounding the shields in a multi-sensor head is generally impractical. Even if the shields are grounded, adverse tribological effects may occur depending on the tape electrical and mechanical characteristics and other aspects of the tape path, such as ground or floating of guides.

Another problem encountered is that the readers are susceptible to shield-shorting which may occur in combination with substrate shorting, as a result of running magnetic recording tape having insufficient lubricity across the head at very low humidity, which in turn is found to produce accumulations of conductive material on the MR element, shields and substrate. Shorting is a well-known cause of reading errors. Proposed solutions, such as prerecessing and/or insulating heads, providing sensor-piggybacked fences and running ionization fans, require changes in head processing, design or implementation, respectively, and so are far more involved than the present invention. For instance, forcibly recessing the sensor so that its components do not develop the conductive accumulation is difficult to manufacture, and also generally produces undesirable spacing loss for the data readers, which must read much higher frequencies than the servo readers. Also, attempting to set shield potentials by tuning the MR bias could result in unacceptable bias values.

There is accordingly a clearly-felt need in the art for a magnetic device with reduced susceptibility to shorting and/or improved tribological characteristics. These unresolved problems and deficiencies are clearly felt in the art and are solved by this invention in the manner described below.

SUMMARY OF THE INVENTION

A magnetic data system according to one embodiment includes a head having a plurality of readers formed above a common substrate, each reader further comprising a shield and a sensor, a bias circuit associated with each reader for passing a bias current through the sensor thereof, wherein the bias circuits are floating. A charge clamp electrically couples each shield to its associated bias circuit. A shield biasing circuit is operatively coupled to each shield for setting a potential of the shield independently of the bias current. The shield biasing circuit may be integral or external to the head.

Any of these embodiments may be implemented in a tape drive system, which may include a magnetic head as recited above, a drive mechanism for passing a magnetic recording tape over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

In the drawings, like and equivalent elements are numbered the same throughout the various figures.

The present invention includes a system for setting the potentials of some or all the MR reader shields, which are assumed to be connected to the MR leads via a charge clamp, to some predetermined potential, preferably that of the wafer substrate and closure, in a manner that is not affected by the bias currents in the readers. Setting the shields to precisely the substrate potential is desirable for reducing or eliminating the surface shorting that otherwise may occur during low humidity operation, especially MR reader errors or even failure during operation at very low humidity due to accumulation of conductive material on the conducting parts of the head. Further, should debris accumulate and create a short from the sensor to the substrate, the low or nonexistent voltage differential therebetween mitigates the effects of such a short.

A basic implementation of the present invention includes a head having a plurality of readers formed above a common substrate, each reader further comprising a shield and a sensor, a floating bias circuit associated with each reader for passing a bias current through the sensor thereof. A charge clamp electrically couples each shield to the associated bias circuit, thereby clamping the shield to the bias circuit. Another circuit is operatively coupled to each shield for setting a potential of the shield independently of the bias current. The shield biasing circuit may be integral or external to the head.

It should be noted that while much of the following description is presented in terms of a magnetic storage system having a R/W head in a piggyback configuration, the teachings herein are applicable to other types of magnetic data systems including those implementing interleaved heads.

Figure 1:
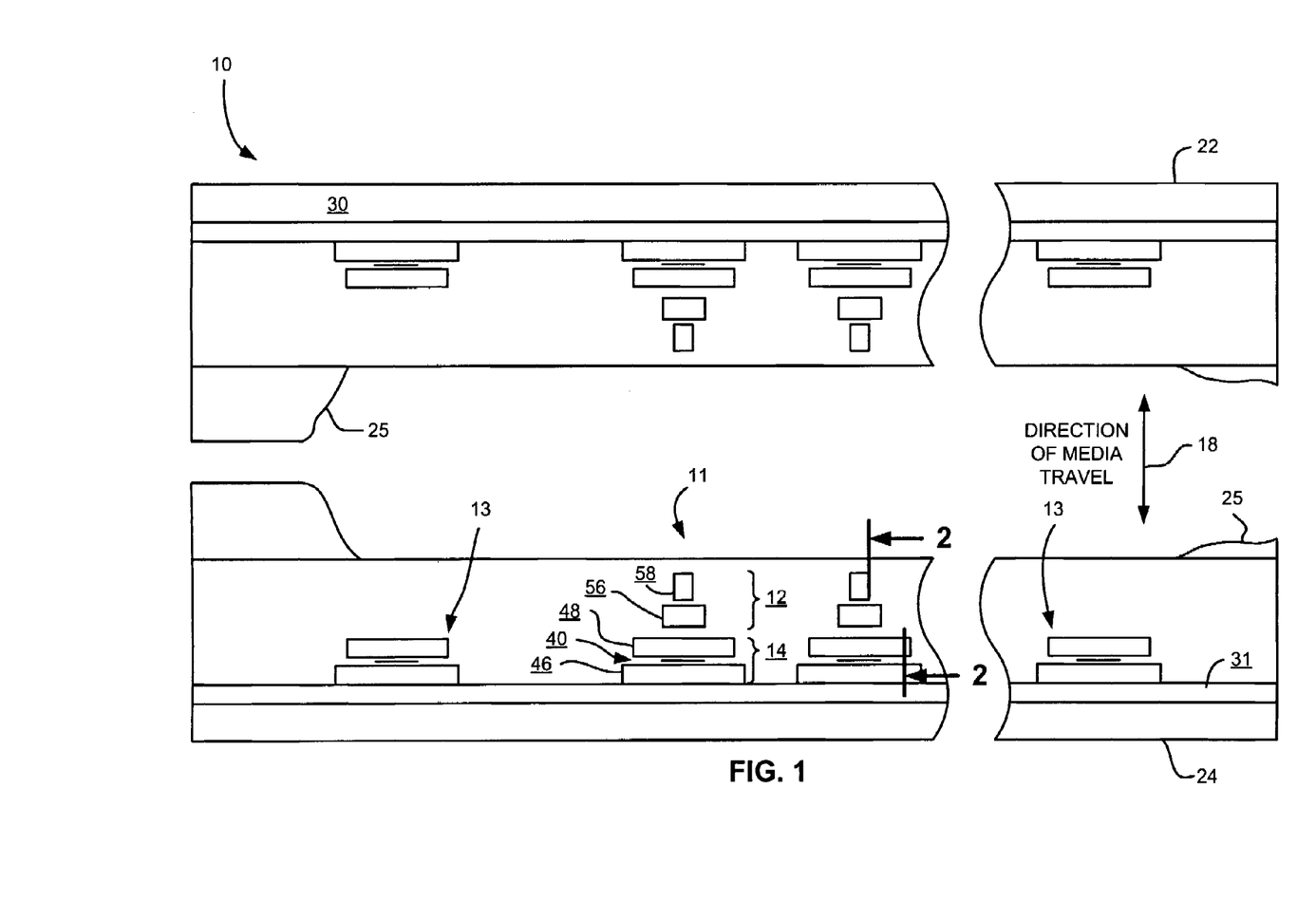
FIG. 1 is a representative tape bearing surface view of a multitrack tape head having a multitude of R/W pairs in a piggyback configuration according to one embodiment of the present invention.

FIG. 1 shows the tape bearing surface (TBS) of an embodiment of a magnetoresistive (MR) head assembly 10 having a plurality of R/W pairs in a piggyback configuration formed on a common substrate 30 and an optional electrically insulative layer 31. The writers, exemplified by the write head 12 and the readers, exemplified by the read head 14, are aligned parallel to a direction of travel of a tape medium thereacross to form a R/W pair, exemplified by the R/W pair 11. Several R/W pairs 11 may be present, such as 8, 16, 32 pairs, etc. The R/W pairs 11 as shown are linearly aligned in a direction generally perpendicular to a direction of tape travel thereacross. However, the pairs may also be aligned diagonally, staggered, in a V-shape, etc. Servo readers 13 are positioned on the outside of the array of R/W pairs, the function of which is well known.

Generally, the magnetic tape medium moves in either a forward or reverse direction as indicated by arrow 18. The magnetic tape medium and head assembly 10 operate in a transducing relationship in the manner well-known in the art.

The piggybacked MR head assembly 10 includes two thin-film modules 22 and 24 of generally identical construction. Modules 22 and 24 are joined together with a space or gap present between modules 25 thereof (partially shown) to form a single physical unit to provide read-while-write capability by activating the writer of the leading module and reader of the trailing module aligned with the writer of the leading module parallel to the direction of tape travel relative thereto.

When a module 22, 24 of a piggyback head 10 is constructed, layers are formed on an electrically conductive substrate 30, e.g., of AlTiC, in generally the following order for the R/W pairs 11: an insulating layer 31, a first shield 46 typically of an iron alloy such as NiFe (permalloy), CZT or Al—Fe—Si (Sendust), a sensor 40 for sensing a data track on a magnetic medium, a second shield 48 typically of a nickel-iron alloy (e.g., 80/20 Permalloy), first and second writer pole tips 56, 58, and a coil (not shown). The first and second writer poles 56, 58 may be fabricated from high magnetic moment materials such as 45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

Figure 2:
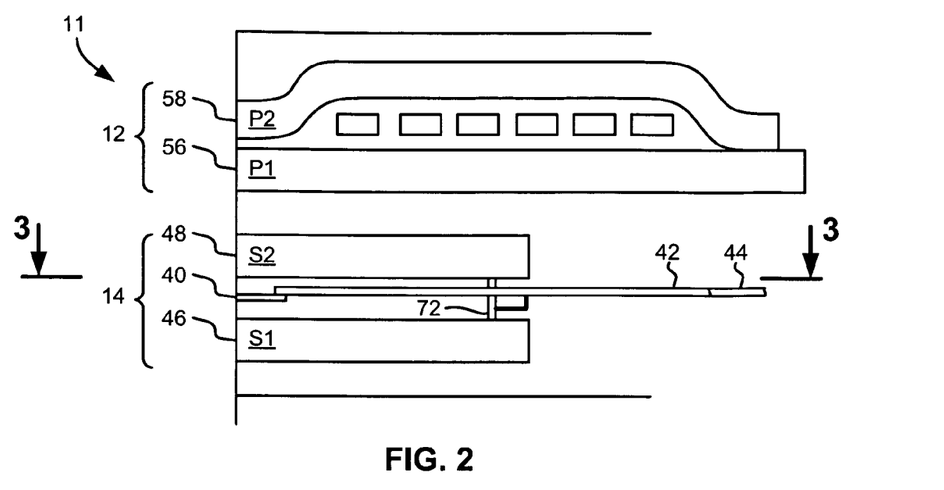
FIG. 2 is a partial cross sectional view taken from Line 2-2 of FIG. 1.

FIG. 2 represents in detail a portion of module 22 from FIG. 1, including portions of an exemplary R/W pair 11. The thin-film elements shown in FIG. 2 are illustrated showing submicron detail in the usual manner and are not to scale. The reader 14, which may be a magnetoresistive (MR) sensor element 40 (e.g., MR, GMR, AMR, MTJ, etc.) is disposed between the two shields 46 and 48 (S2 & S1), with each MR sensor end coupled to an electrical lead conductor 42 and 44. The relative disposition of electrical lead conductors 42, 44 may be better appreciated with reference to FIG. 3, which illustrates a cross-sectional view of the reader 14 from FIG. 2 taken along section line 3-3.

With continued reference to FIG. 2, in tape systems, the shields 46, 48 can become charged by the action of the tape brushing thereacross. If the shields 46, 48 are floating (not connected or grounded), they may charge up to a high voltage (e.g., 10V or higher), then discharge, potentially through the MR sensor 40. The backside of the tape does not have a magnetic coating. Rather, the backside of the tape is electrically conductive and is rougher than the magnetic side. The roughness assists in winding the tape onto a reel. To make the backside of the tape conductive and rough, carbon particles are formed thereon. The carbon itself can flake off and run across the tape-head interface, creating electrically conductive bridging. The particles can create enough of a bridge to initiate a discharge of the shield into the sensor, creating a spike in the signal.

A charge clamp circuit removes the charge, and sets the voltage (Vshield) of the shield at roughly the same voltage as the sensor, as described immediately below.

Figure 3:
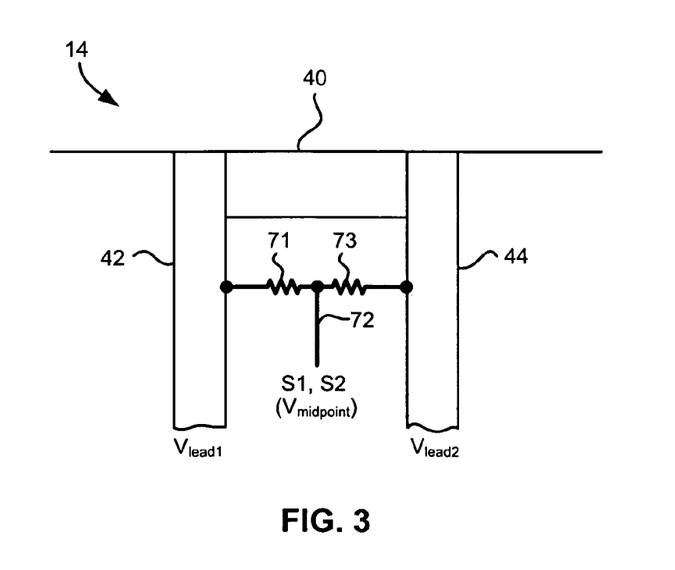
FIG. 3 is a partial cross sectional view taken from Line 3-3 of FIG. 2.

According to an embodiment of the invention, within each read head, which is exemplified by reader 14, MR element shields 46, 48 may also be connected to the leads 42, 44 of the sensor 40 via a circuit 72 in a configuration referred to as a charge clamp, as shown in FIGS. 2 and 3. As shown in FIG. 3, resistors 71, 73 are positioned between the leads 42, 44, thereby forming a conducting path from leads 42 to 44. The resistor 71, 73 must be large enough so as not to short circuit the MR reader. Resistors 71, 73 are preferably of equal magnitude for reasons which will soon become apparent, but may be of differing magnitude. The resistors 71, 73 may have a resistance of less than about 500 kilOhms (kOhms). Also note that resistors 71, 73 (and all other resistors described herein) may each be formed of multiple resistors, active resistors, tunable resistors, etc.

The shields 46, 48 are coupled to the circuit at a point between the resistors 71, 73. The circuit acts as a voltage divider, where the voltage (Vshield) of the shields is at a level near a midpoint between the lead voltages, e.g., $V_{midpoint} = (V_{lead1} + V_{lead2})/2$. This midpoint is about the voltage of the midpoint of the sensor 40 between the leads 42, 44. Thus, the sensor 40 and shields 46, 48 are at about the same voltage. As noted above, voltage differentials on MR devices are strongly implicated in unfavorable tribological processes such as electrochemical reactions and electrostatic accumulation of debris. Because the sensor 40 and shields 46, 48 are at about the same voltage level, tribological effects such as corrosion and accumulations are reduced. Further, the chance of an electrical discharge between the shields 46, 48 and the sensor 40 is minimized.

The electrical connections exemplified by charge clamp circuit 72 (FIG. 2) may be made independently for each reader-writer pair. Charge clamp circuit 72, or portions thereof, are preferably non-magnetic and may be formed by depositing a layer of conductive metal, such as tantalum, or any other useful material of high to intermediate resistivity. The charge clamp circuit 72, or portions thereof, can also be formed by creating a via which is filled with an electrically conductive material such as copper or gold.

Figure 4:
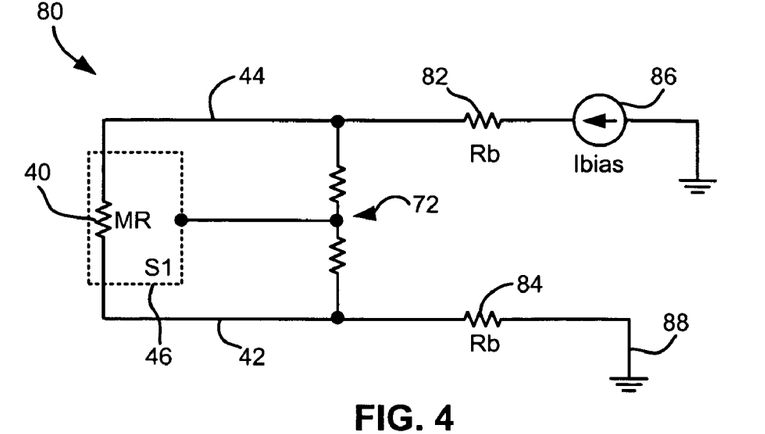
FIG. 4 is a circuit diagram of a grounded MR bias circuit.

For reference, FIG. 4 is included to illustrate a grounded MR bias circuit 80. The MR bias circuit 80 includes the leads 42, 44 coupled to the sensor 40 and the charge clamp circuit 72 coupling the shield 46 to the leads 42, 44. Biasing resistors (Rb) 82, 84 are positioned between the bias current (Ibias) source 86 and sensor 40, and sensor 40 and ground 88, respectively.

Figure 5:
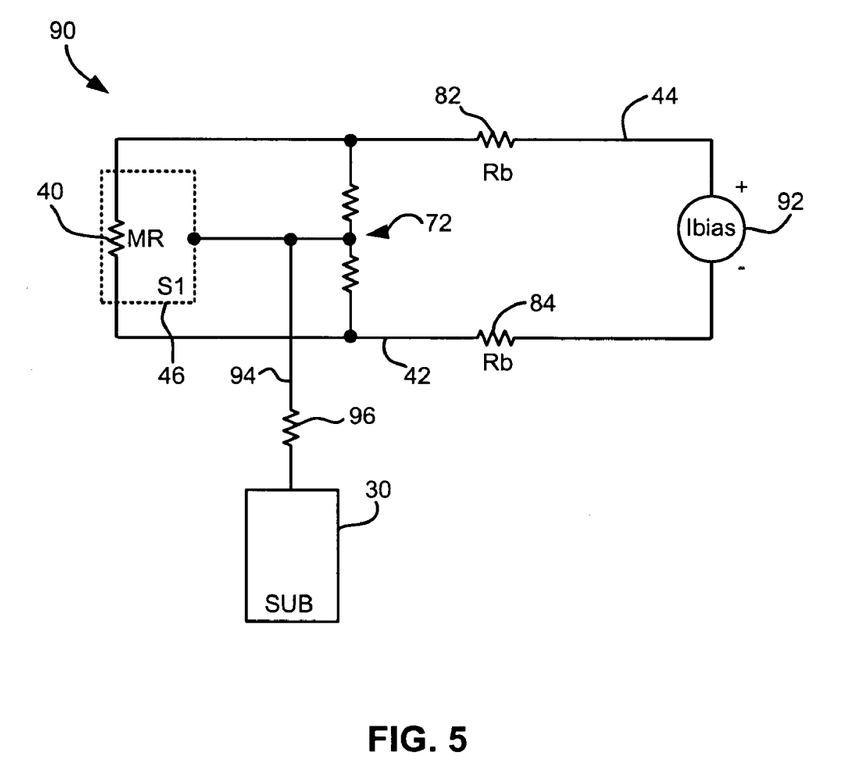
FIG. 5 is a circuit diagram of a floating MR bias circuit and shield biasing circuit according to one embodiment of the present invention.

FIG. 5 illustrates a floating MR bias circuit 90 according to one embodiment of the present invention. The MR bias circuit 90 includes the leads 42, 44 coupled to the sensor 40 and the charge clamp circuit 72 coupling the shield 46 to the leads 42, 44. Biasing resistors (Rb) 82, 84 are operatively positioned on the leads 42, 44 between the MR bias current source 92 and sensor 40.

A shield biasing circuit 94 allows setting of the shield potentials independently of the bias current. There are several basic implementation modes for the shield biasing circuit 94, including construction internal to the wafer and external to the head. Common to all modes is independently programmable and floating biasing for each sensor shield or pair of shields 46, 48. "Floating" means that the MR bias circuit 90 (either constant current or voltage) does not have a voltage reference, e.g. it does not tie to ground. Conceptually, the floating MR bias current source 92 can be thought of as the functional equivalent of a battery. Aside from batteries, other illustrative floating MR bias current sources include torroidal transformer coupled circuits of a type commonly used in power supplies or equivalent semiconductor circuits.

In one embodiment of the shield biasing circuit 94 internal to the wafer, shown in FIG. 5, one or both of the shields of a given reader operatively connect to a third resistor 96, e.g., thin film resistor of the shield biasing circuit 94 (the other two resistors are part of the charge clamp 72 and connect to the leads 42, 44). The biasing circuit 94 can be coupled to the charge clamp circuit 72 as shown, but could also be connected directly to the bottom shield, the upper shield, etc.

The third resistor 96 in this embodiment also operatively connects to the substrate 30 by means of a via or other electrical connection. Because the MR bias current is being provided by a circuit 90 that has no reference voltage, the MR biasing circuit 90 is referenced by virtue of the connection to the substrate 30 via the shield biasing circuit 94.

As mentioned above, the present invention allows setting the shield potentials to match the substrate potential. This allows the substrate to be set at a given substrate voltage (Vsub), and the Vshield of each shield can be made to match Vsub. Vsub may be set or connected to ground, and this generally simplifies bias circuit implementation.

The voltage matching enabled by the present invention is believed to provide benefits by at least temporarily eliminating the electric field between the reader shield and substrate. This is desirable because the formation of low humidity conductive bridges appears to be driven at least in part by these and other electric fields. Should a bridge develop, provided it does not have very low resistance (<50 kOhms), which is generally not observed, then negligible common mode current will flow into the shields, because of the small potential difference between substrate and shields. Additionally, because Vshield and Vsub are close in voltage level, tribological effects such as corrosion and accumulations are reduced. Further, the probability of an electrical discharge occurring between the shields and the substrate is minimized. To mitigate the effect of the accumulation it is preferable to make the difference between the substrate and shield potentials for each sensor less than approximately 0.1 volts.

Figure 6:
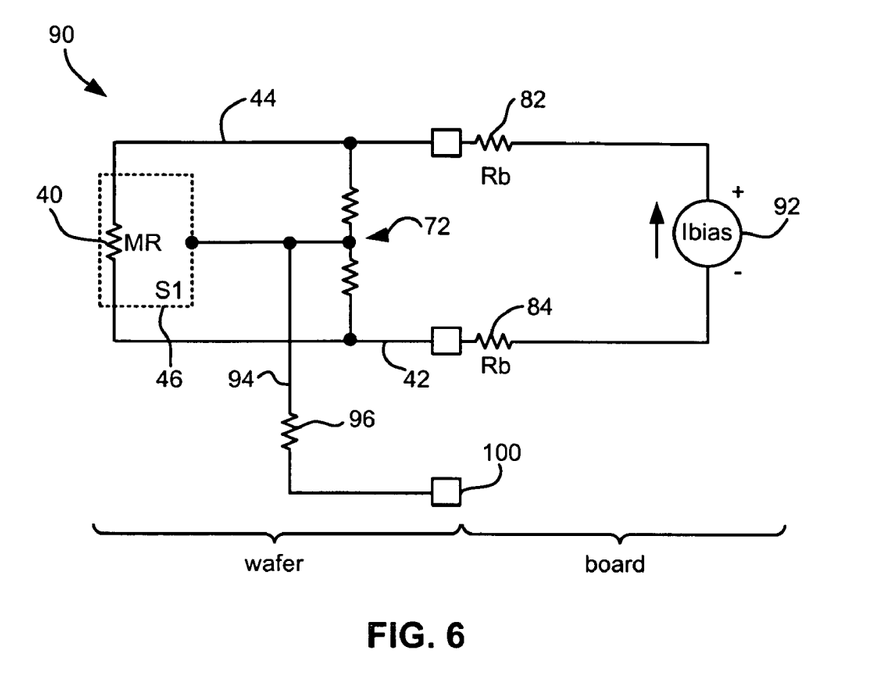
FIG. 6 is a circuit diagram of a floating MR bias circuit and shield biasing circuit according to another embodiment of the present invention.

FIG. 6 illustrates another embodiment of a floating MR bias circuit 90 and internal shield biasing circuit 94. In this embodiment, the shield biasing circuit 94 is coupled to a contact 100, e.g., pad, on the wafer for external connection. The external connection may in turn be coupled to the substrate, a matching circuit simulating the Vsub, or other circuit e.g., in the controller. In this embodiment, where the shield biasing circuit 94 is coupled to a third pad 100, the internal series resistor is not required.

Figure 7:
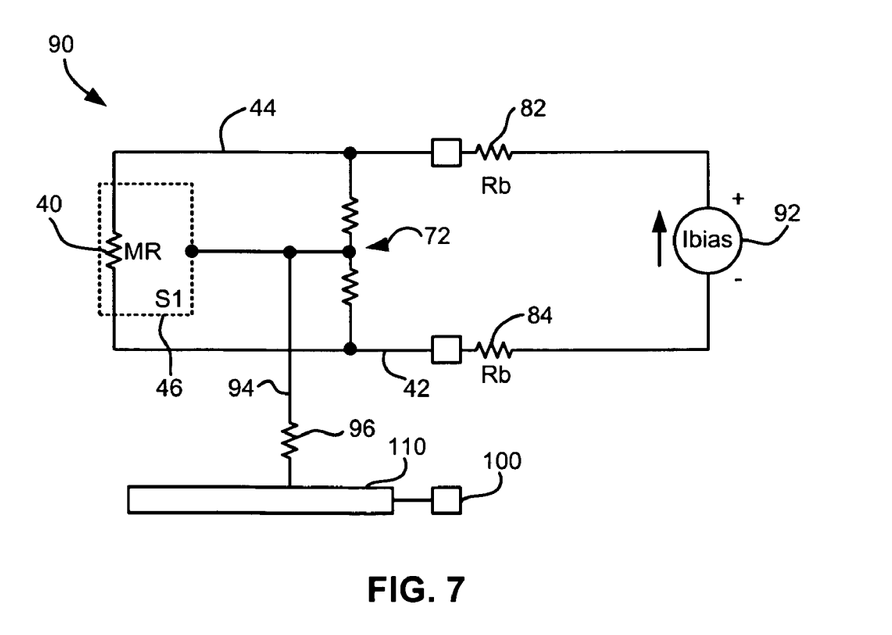
FIG. 7 is a circuit diagram of a floating MR bias circuit and shield biasing circuit according to yet another embodiment of the present invention.

FIG. 7 illustrates another embodiment of a floating MR bias circuit 90 and internal shield biasing circuit 94. In this embodiment, the shield biasing circuit 94 is coupled to a bus bar 110 internal to the wafer. The bus bar 110 may in turn be coupled to a contact 100 on the wafer for external connection or alternatively connected internally to the substrate.

In the external mode, the potential of the shield can be set using one of several mechanisms. One embodiment of a floating MR bias circuit 90 and external (to the head) shield biasing circuit 120, shown in FIG. 8, includes a center-tapped pair of resistors 122, 124 across the MR element and a voltage source 126, e.g., substrate, substrate biasing circuit, or other voltage source. The resistors 122, 124 may be positioned on the circuit board.

Figure 9:
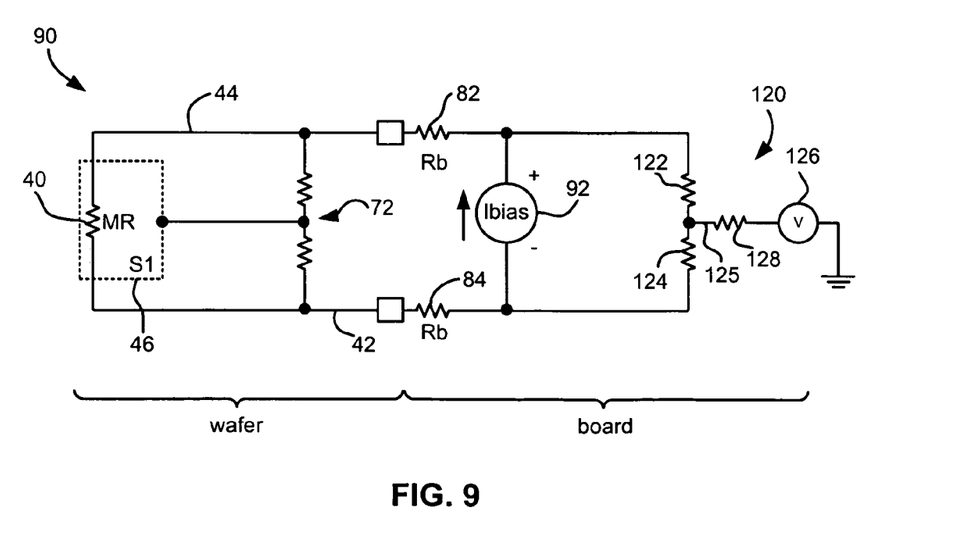
FIG. 9 illustrates another embodiment of a floating MR bias circuit and external shield biasing circuit according to another embodiment of the present invention.

FIG. 9 illustrates an embodiment of a floating MR bias circuit 90 and an external shield biasing circuit 120, which includes a center-tapped pair of resistors 122, 124 across the entire MR bias circuit 90. Positioning the center-tapped pair of resistors across the entire bias circuit (outside the bias resistors (Rb) 82, 84) reduces current shunting.

Figure 8:
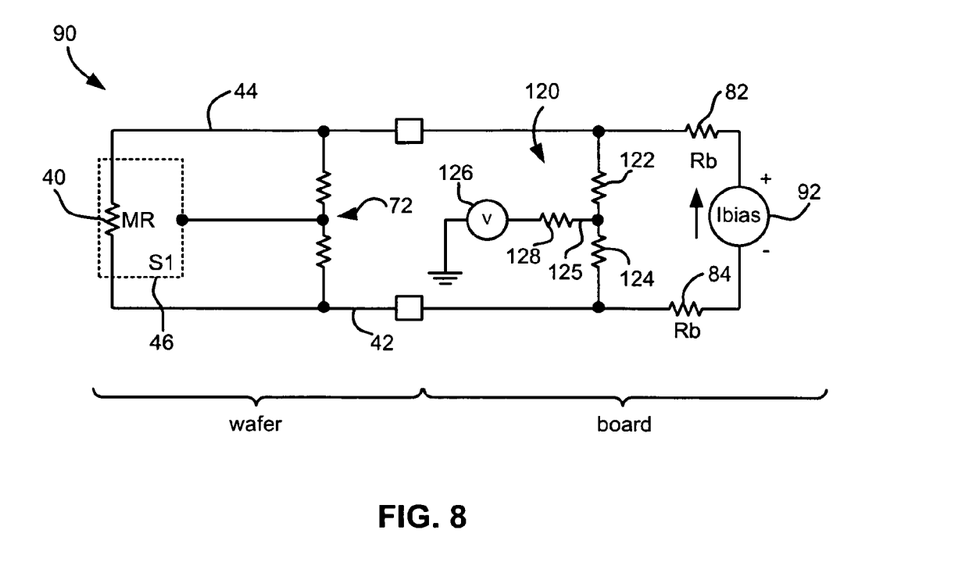
FIG. 8 illustrates an embodiment of a floating MR bias circuit and external shield biasing circuit according to one embodiment of the present invention.

In either case, the center tap lead 125 is used to set the potential of the MR bias circuit 90. It is preferable to set this to the substrate potential. A series resistor 128 may be used between the reference voltage source (e.g., substrate) and center tap.

Each sensor may have an independent shield biasing circuit dedicated thereto for allowing individual definition of the shield potentials. Alternatively, all sensors may be coupled to the same shield biasing circuit.

Using any of the embodiments disclosed herein, the shield potentials of each reader in a multisensor head can be set to precisely a preset voltage and this is accomplished independently of any MR bias adjustment. In addition the reference voltage for the shield bias circuit, which preferably now is the substrate voltage, can be set to any reasonable positive or negative value, including system ground voltage. Setting the reference voltage to ground makes the system very immune to the effects of shorting.

An optional substrate biasing circuit may also be present to set the wafer substrate voltage (Vsub) to some voltage level. This presumes of course that the substrate is electrically conductive, as assumed in the foregoing description. An illustrative substrate is formed of AlTiC, which is electrically conductive.

Figure 10:
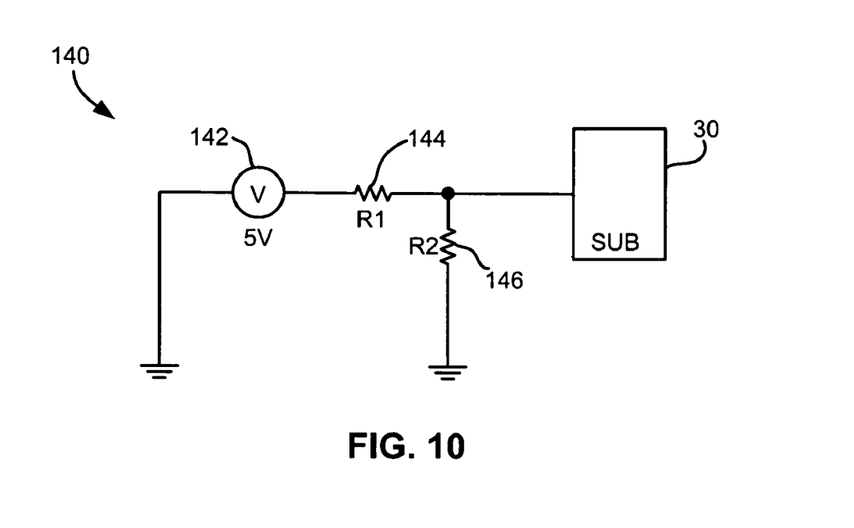
FIG. 10 is a circuit diagram of a substrate biasing circuit according to one embodiment of the present invention.

FIG. 10 depicts an illustrative substrate biasing circuit 140 according to one embodiment of the present invention. As shown, the substrate biasing circuit 140 includes a series resistance to ground, effected between a voltage source 142 and ground by a pair of resistors R1 and R2 144, 146. The circuit 140 is coupled to the substrate 30 at a point between the resistors (R1, R2) 144, 146, and thereby is able to set Vsub to any desired level.

The power supply in the drive can be used as the voltage source 142. In this example, the power supply is 5V, but a source providing any desired value can be used. The power supply has zero input impedance, so looking back into the circuit from the substrate 30, the circuit appears to have resistor R1 144 in parallel with resistor R2 146 to ground.

The series resistance to ground in the substrate biasing circuit 140 of FIG. 10 or equivalent circuit may be in the range of 50-200 times the MR bias circuit individual bias resistor values. For instance, assuming each bias resistor resistance value is 150 Ohms, then the parallel combination of R1 and R2 would have a value of 7500 to 30000 Ohms. By setting this impedance to ground via resistors R1 and R2 144, 146, a debris bridge of say a few kOhms between the substrate and shield in series with an additional bridge between the sensor element and the shield at worst would draw only a small portion of the MR bias current through the substrate path to ground. Making the resistors R1 and R2 144, 146 larger might seem preferable for mitigating current shunting and other problems. Series resistances much larger than the individual Rb values are less preferred, as the substrate voltage may begin to be affected by tribocharging from the tape. For example, the tape itself may become charged by the motion of the tape through the drive and over the head. This phenomenon is commonly referred to as tribocharging. As a result, substrate currents of the order of several microamperes typically flow between head and tape because the substrate is connected to ground. Since the effective source impedance for the tribocurrent from the tape is of the order of 10s of MegOhms (MOhms), substrate resistances of the order of MOhms would not drop the tribovoltage, which would thus be in the volts range. Thus, the largest preferred series resistance is in the 10-50 kOhm range, assuming an Rb resistance value of about 150 Ohms and Vsub≈Vshield≈1.50V. Higher and lower resistance values and ranges, however, are considered to be within the scope of the present invention.

The circuit that sets the substrate voltage may also be a fixed, higher value voltage source and resistance divider, or a regulated voltage source set to the desired value, optionally with a resistor inserted between the source and substrate to minimize the impact of conductive bridges.

Figure 11:
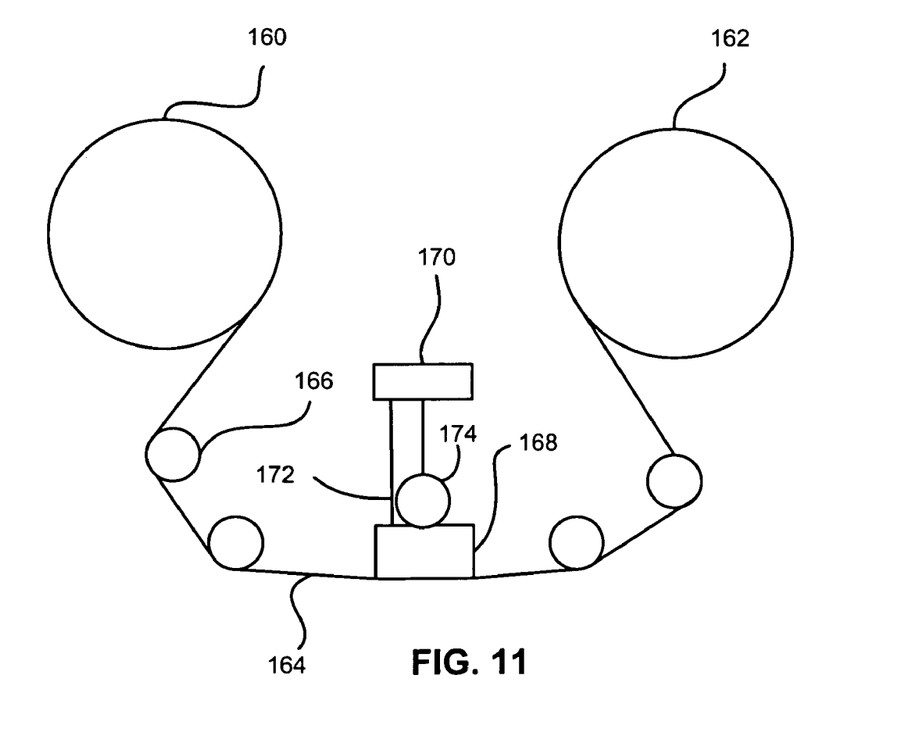
FIG. 11 is a system diagram of a magnetic data system.

FIG. 11 illustrates a simplified magnetic recording system, particularly a tape drive and magnetic recording medium, which may be employed in the context of the present invention.

As shown, a tape supply cartridge 160 and a take-up reel 162 are provided to support a tape 164. These may form part of a removable cassette and are not necessarily part of the system. Guides 166 guide the tape 164 across a preferably bidirectional tape head 168, of the type disclosed herein. Such tape head 168 is in turn coupled to a controller assembly 170 via a connector cable 172. The controller 170, in turn, controls head functions such as servo following, write bursts, read functions, etc.

A tape drive, such as that illustrated in FIG. 11, includes drive motor(s) to drive the tape supply cartridge 160 and the take-up reel 162 to move the tape 164 linearly over the head 168. The tape drive also includes a read/write channel to transmit data to the head 168 to be recorded on the tape 164 and to receive data read by the head 168 from the tape 164. An interface is also provided for communication between the tape drive and a host (integral or external) to send and receive the data and for controlling the operation of the tape drive and communicating the status of the tape drive to the host, all as will be understood by those of skill in the art.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A magnetic data system, comprising:
a head having a plurality of readers formed above a common substrate, each reader further comprising a shield and a sensor;
a bias circuit associated with each reader for passing a bias current through the sensor thereof, wherein the bias circuits are floating; and
a shield biasing circuit operatively coupled to each shield for setting a potential of the shield independently of the bias current,
wherein the shield biasing circuit is integral to the head,
wherein the shield biasing circuit is electrically coupled to the substrate,
wherein the shield biasing circuit further comprises a resistor coupled between the shield and the substrate.

2. A system as recited in claim 1, wherein the potential of each shield is set to match about a potential of the substrate.

3. A system as recited in claim 2, wherein the potential of each shield is set to within less than about 0.1V of the potential of the substrate.

4. A magnetic storage system as recited in claim 2, further comprising a substrate biasing circuit.

5. A system as recited in claim 1, wherein the potential of each shield is set to ground.

6. A system as recited in claim 1, wherein multiple shield biasing circuits are present, each shield biasing circuit being operatively coupled to one of the shields.

7. A system as recited in claim 1, further comprising a charge clamp having leads that electrically couple each shield to the associated bias circuit.

8. A system as recited in claim 1, further comprising: a drive mechanism for passing a magnetic recording tape over the head; and a controller electrically coupled to the head.

9. A system as recited in claim 1, wherein the shield biasing circuit is coupled to a pad on the head.

10. A system as recited in claim 1, wherein the shield biasing circuit is coupled to a bus bar of the head.

11. A system as recited in claim 1, wherein the same shield biasing circuit is operatively coupled to all of the shields.

12. A magnetic data system comprising:
a head having a plurality of readers formed above a common substrate, each reader further comprising a shield and a sensor;
a bias circuit associated with each reader for passing a bias current through the sensor thereof, wherein the bias circuits are floating; and
a shield biasing circuit operatively coupled to each shield for setting a potential of the shield independently of the bias current,
wherein at least a portion of the shield biasing circuit is located remotely from the head,
wherein the shield biasing circuit further comprises two resistors coupled to each bias circuit across the associated sensor and a reference voltage source coupled between the resistors.

13. A system as recited in claim 12, wherein the shield biasing circuit is electrically coupled to the substrate.

14. A magnetic data system comprising:
a head having a plurality of readers formed above a common substrate, each reader further comprising a shield and a sensor;
a bias circuit associated with each reader for passing a bias current through the sensor thereof, wherein the bias circuits are floating; and
a shield biasing circuit operatively coupled to each shield for setting a potential of the shield independently of the bias current,
wherein at least a portion of the shield biasing circuit is located remotely from the head wherein the shield biasing circuit further comprises two resistors coupled across each bias circuit and a reference voltage source coupled between the resistors.

* * * * *